Nov. 1, 1960

O. SNEDKERUD 2,958,725

ELECTRONIC PLOTTING STATION FOR AUTOMATIC PLOTTING
OF ONE OR MORE MOVABLE OBJECTS

Filed Sept. 27, 1955

INVENTOR
O. SNEDKERUD

BY

ATTORNEY

Nov. 1, 1960     O. SNEDKERUD     2,958,725
ELECTRONIC PLOTTING STATION FOR AUTOMATIC PLOTTING
OF ONE OR MORE MOVABLE OBJECTS
Filed Sept. 27, 1955     5 Sheets-Sheet 3
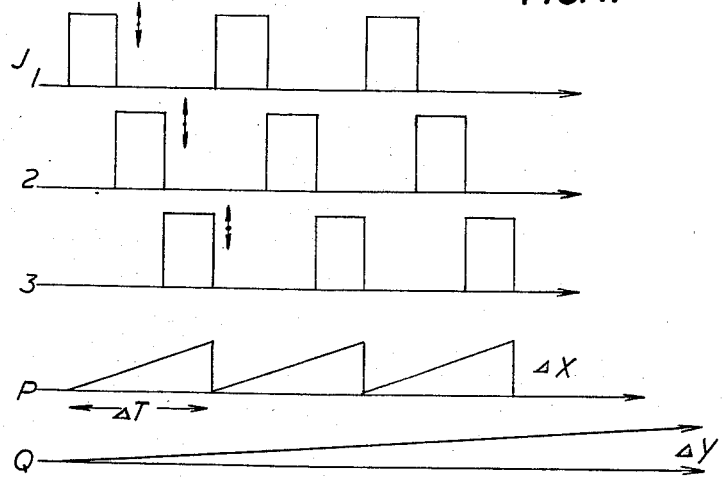
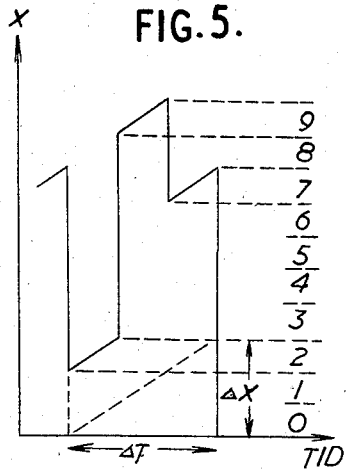
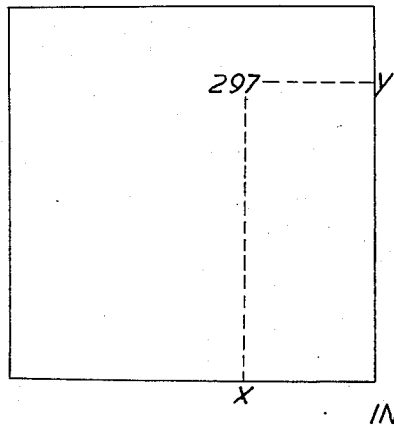
INVENTOR
O. SNEDKERUD
BY
ATTORNEY

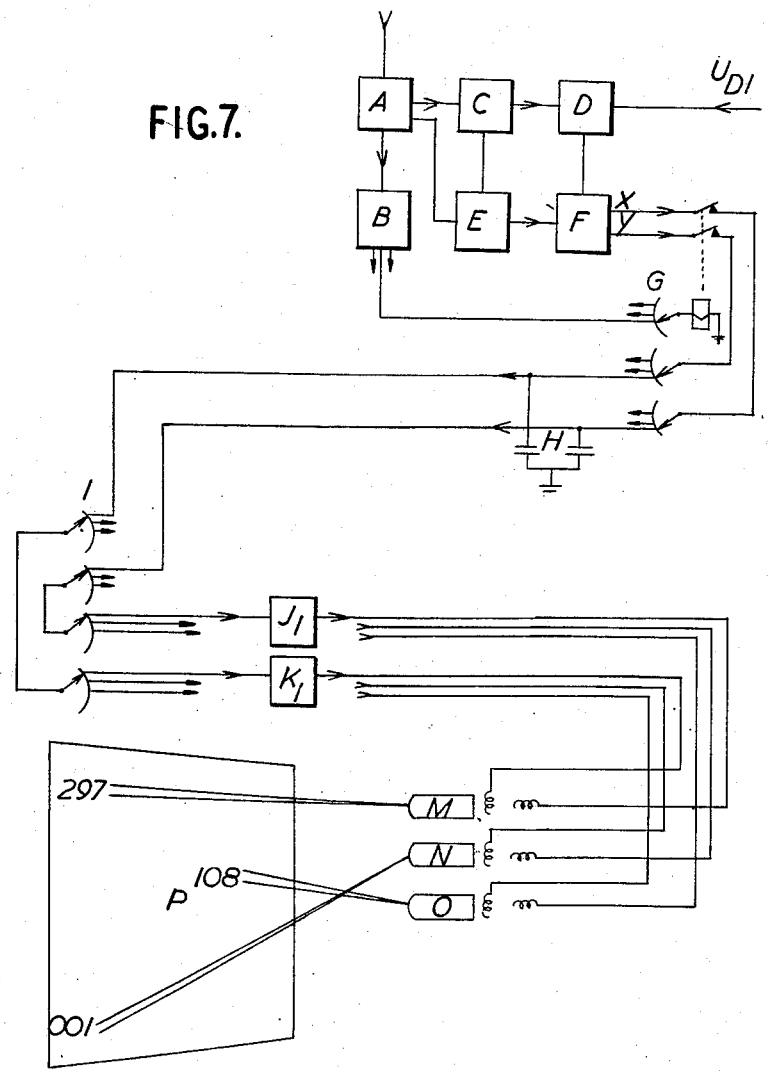

Nov. 1, 1960  O. SNEDKERUD  2,958,725
ELECTRONIC PLOTTING STATION FOR AUTOMATIC PLOTTING
OF ONE OR MORE MOVABLE OBJECTS
Filed Sept. 27, 1955  5 Sheets-Sheet 5
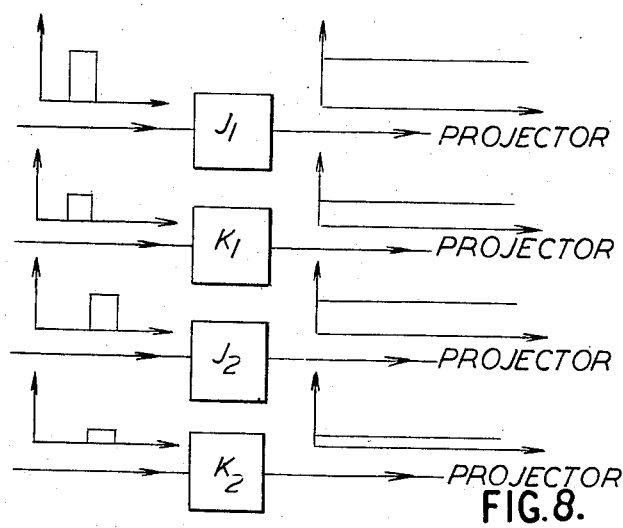
FIG. 8.
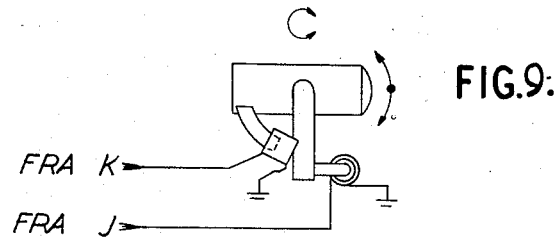
FIG. 9.
FIG. 10.
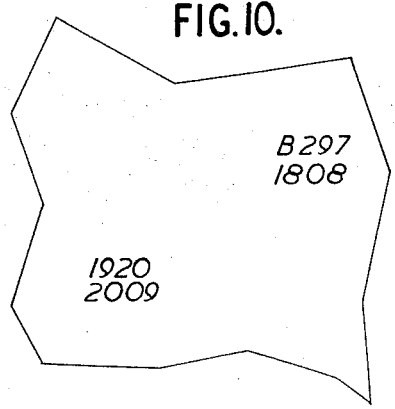
INVENTOR
O. SNEDKERUD
BY
ATTORNEY

United States Patent Office 2,958,725
Patented Nov. 1, 1960

2,958,725

ELECTRONIC PLOTTING STATION FOR AUTOMATIC PLOTTING OF ONE OR MORE MOVABLE OBJECTS

Ole Snedkerud, Oslo, Norway, assignor to International Standard Electric Corporation, New York, N.Y., a corporation of Delaware Filed Sept. 27, 1955, Ser. No. 536,949

Claims priority, application Norway Oct. 8, 1954

5 Claims. (Cl. 178—6.8)

The present invention concerns a plotting station which indicates the positions of one or more movable objects simultaneously, for instance fighter planes.

Because of the great velocities which modern aircrafts lately have reached it has become more difficult for the operators serving an operation room for fighters to keep the display on the plotting table in correspondence with the real conditions in the air. Because of the delay occurring during the plotting work, for instance direction finding, triangulation and manual plotting, there has during a long period been present a need for equipment which automatically undertakes all the work. Because the plotting work previously has been executed manually many error sources have been present.

In order to conduct operations of modern aircrafts it is very essential that the staff at any time has correct information of the positions of the planes, and in the shortest possible time with great correctness be able to obtain information concerning the positions of the planes. According to the present invention there is provided electronic equipment which automatically indicates the position of a plane when a radio connection is established between the airplane concerned and the plotting station. The position of the plane will, thereafter, be indicated on the plotting table in the position the airplane possessed at the moment of transmission until radio connection again is established between the same plane and the plotting station.

The invention concerns thus an automatic-plotting station which comprises means for indication of direction and distance from the plotting station to one or more movable objects, for instance fighter planes. The characteristic feature of the invention is that each object is allotted an individual and characteristic code signal which is sent out together with a retransmitted signal from the object. The code signals are received by the receiver antenna of the plotting station and supplied to devices for production of signals indicating direction and distance. These devices are associated with a translator of any well known type. The output voltages from the translator represent the position of the object in $x$ and $y$ coordinates relative to the plotting station. Each individual code signal controls a device which causes the said output signals to be applied to a memory device which is individual for each code signal, and which periodically is scanned by means of a scanning device. The scanning device is connected in parallel with devices for production of number and/or letter combinations, particular figure combinations or the like, corresponding to various characteristic code signals. Under control of the said combinations there are displayed on a screen an indication which corresponds to the position of the object relative to the plotting station.

According to another feature of the invention the devices which produce the said combination comprise a pulse generator, scanning devices which are in synchronism with the said scanning devices, a flying spot scanner and a memory tube. These scanning devices scan the pulse generator which supplies code signals corresponding to the characteristic code signals for each object and applied over individual circuits to the flying spot scanner for the provision of a modulated signal in order to bring about certain combinations. These signals represent certain combinations and are applied to the grid of the memory tube. The deflecting plates of this tube are supplied with the said output signals representing the position of the object in $x$ and $y$ coordinates relative to the plotting station, such that this combination, being characteristic for the object, is displayed on the screen of the memory tube in the correct position.

These and other features will more clearly appear from the following embodiment which is explained in detail.

Fig. 4 shows pulses from a pulse and saw tooth wave generator;

Fig. 5 shows an example of pulses supplied to the horizontal ($x$) deflecting plates in the flying spot scanner;

Fig. 6 shows the characteristic code indication "297" of a plane shown on the map-screen;

Fig. 7 shows a block diagram of the simultaneous electronic plotter SEP having servo controlled projectors;

Fig. 8 shows an example of pulses supplied to the servo amplifiers having constant output voltages;

Fig. 9 shows an example of the control of a projector; and

Fig. 10 shows a section of the map-screen showing an individual fighter (squadron-leader) and an enemy formation of planes.

Fig. 1 shows an arrangement of the equipment needed for operation of the simultaneous electronic plotter which comprises:

(1) Standard VOR (VHF omni-directional range) equipment for distance measuring, alternating voltage, having for example a frequency of 800 p./s. modulated on the VOR transmitter.

(2) Standard communication equipment in the frequency band 100–150 M p./s.

(3) A pulse device in the plane for indication.

For aircrafts in which VOR equipment already is installed, the pulse-supplier only is added. The different letters in the figures refer to:

(A) Ground, VHF receiver, frequency band 100–150 M p./s.

(B) Ground, VHF transmitter, frequency band 100–150 M p./s.

(C) VOR, VHF transmitter, frequency band 100–150 M p./s.

(D) VOR, VHF receiver, frequency band 100–150 M p./s.

(E) Pulse supply device.

(F) Aircraft, transmitter/receiver, frequency band 100–150 M p./s.

(G) Azimuth indicator (normal VOR equipment).

(H) Distance indicator (the possibility of installation is a result of the arrangement, the reading is, however, not ordinarily continuous as in the azimuth indicator G).

Figure 1:
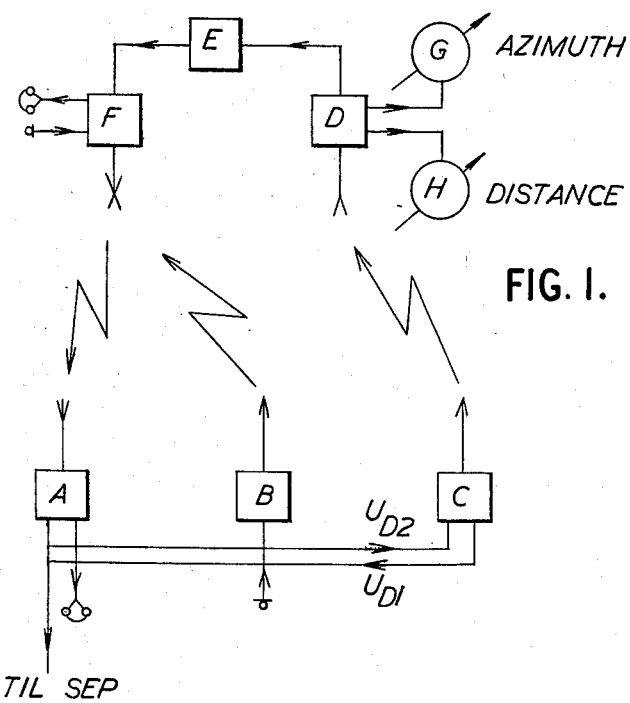
Fig. 1 shows a block diagram of radio installations on the ground and in the aircraft.

In order to appreciate the operation of the system the transmitter C (Fig. 1) is first considered. The transmitter sends out a carrier wave which is amplitude modulated by three alternating voltages being generated in the transmitter $$U_{A1} = A \sin(\omega_A t + \alpha) \tag{1}$$

where $\alpha$ is proportional to azimuth (the direction of the plane from the transmitter). $\alpha=0$ when the plane is due north of the transmitter, and $$\omega_A = 2\pi 30 = 60\pi \text{ rad/s.} \quad (2)$$

$$U_{D1} = B \sin \omega_D t \quad (3)$$

where $$\omega_B = 2\pi 800 = 1600\pi \text{ rad/s.} \quad (4)$$

which is used for distance measuring, and $$U_{B1} = C \sin \omega_B t \quad (5)$$

where $$\omega_B = 2\pi 10,000 = 20,000\pi \text{ rad/s.} \quad (6)$$

which is frequency modulated with two alternating voltages, $$U_{A2} = A \sin \omega_A t \quad (7)$$

where $$\omega_A = 60\pi \text{ rad/s.} \quad (2)$$

which is generated in the transmitter, and $$U_{D2} = \sin(\omega_D t + 2\varphi) \quad (8)$$

where $\omega_D = 1600\pi$ rad/s. and $\varphi$ is proportional to the distance between the aircraft and the VOR transmitter. The alternating voltage $U_{D2}$ corresponds to the voltage $U_{D1}$ after being sent from the transmitter C, received by the receiver D of the plane, retransmitted from the transmitter F, received by the ground station A and applied to the transmitter C. (For the sake of simplicity the phase displacement is not considered in the airplane stations and the ground stations.)

In the plane the following alternating voltages are received:

$$U'_{A1} = A \sin(\omega_A t + \alpha + \beta) \quad (9)$$

and $$U'_{A2} = A \sin(\omega_A t + \beta) \quad (10)$$

where $\omega_A = 60\pi$ rad/s. and $\beta$ is the phase displacement by the distance, and $\alpha$ is the angle proportional to azimuth. The phase difference between (9) and (10) is $\alpha$, and the direction can, therefore, be read independent of the distance.

Further, in the aircraft we obtain $$U'_{D1} = B \sin(\omega_D + \varphi) \quad (11)$$

and $$U'_{D2} + B \sin(\omega_D 3\varphi) \quad (12)$$

where the alternating voltage in (11) is (3) and in (12) is (8). When these voltages are measured in the plane and $$\omega_D = 1600\pi \text{ rad/s.} \quad (4)$$

as previously. The phase displacement between (11) and (12) is $2\varphi$, and $\varphi$ is proportional to the distance between the aircraft and VOR transmitted as indicated in (8).

The output signals from the ground receiver A are then:

$$U''_{A1} = A \sin(\omega_A t + \alpha + 2\beta) \quad (13)$$

$$U''_{A2} = A \sin(\omega_A t + 2\beta) \quad (14)$$

$$U''_{D1} = B \sin(\omega_D t = 2\varphi) = U_{D2} \quad (8a)$$

$$U''_{D2} = B \sin(\omega_D t + 4\varphi) \quad (15)$$

where $\omega_A$ and $\omega_D$ are previously mentioned.

In the simultaneous electronic plotter, SEP, the alternating voltages (3) and (8) are used where the phase difference is $2\varphi$ for indication of the distance, and (13) and (14) where the phase difference is $\alpha$ for indication of the direction. There are, however, two other alternating voltages where the phase difference is $2\varphi$, namely between the alternating voltages (8) and (15). The distance and the direction of the plane can therefore be obtained by reception on another receiver without having a line or a link connection between this other receiver and the transmitter C. This can preferably be used when the plane is operating on another channel (frequency), which corresponds to another ground station (homing), or ground control approach (GCA) station etc., where the VOR equipment is installed and used for homing, such that the positions of these planes are plotted.

For indication of the identity of an aircraft the pulse supplier E (Fig. 1) is used. This supplier can for instance key the alternating voltage (12) with a square wave pulse $$U_{I} = \frac{Dd}{2\pi} \sum_{1}^{n} \frac{Dd}{\pi} \cdot \frac{\sin \frac{nd}{2}}{\frac{nd}{2}} \cos n\gamma \quad (16)$$

where $D$ = the peak voltage of the pulse
$d$ = the length of the pulse
$n$ = the number of harmonics
$\alpha = 2\pi f_p t$
$f_p$ = the repetition frequency in p./s.

Figure 2:
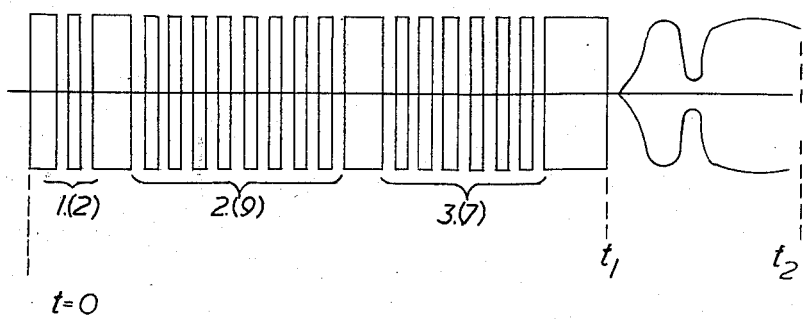
Fig. 2 shows radio signals transmitted from the plane, as a function of time.

$f_p$ ought to be approximately 100 p./s., such that the time for transmission of a maximum of 30 pulses (three digits of 10 pulses) does not become too long. In Fig. 2 is shown the signal which is retransmitted from the aircraft (for the sake of simplicity only the alternating voltage (11) modulated by (16) is shown). The pulsation is occurring during the period $t_0$–$t_1$, approximately ⅓ sec. maximum, and normal modulation during the period $t_1$–$t_2$ (information from the pilot to the ground station).

The alternating voltage to be used in the SEP equipment is as follows:

(a) Indicator pulses (16) modulated by alternating voltage (11), and
(b) Alternating voltages (3), (8), (13) and (14).

Figure 3:
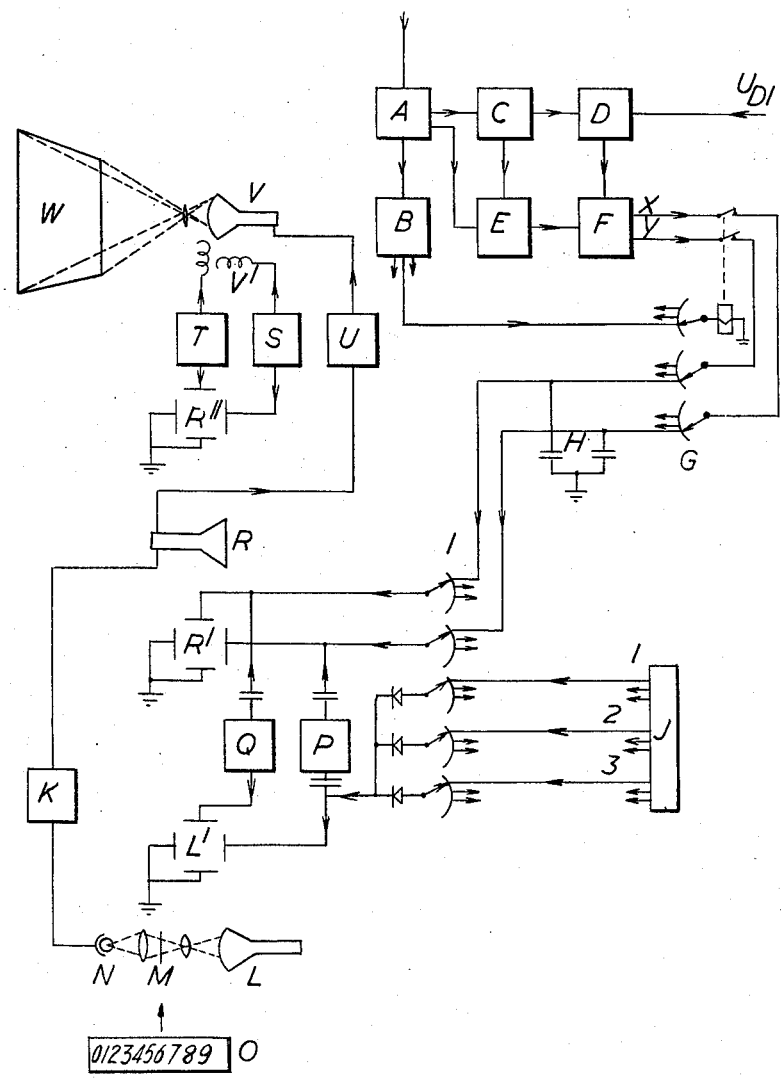
Fig. 3 shows a block diagram of the simultaneous electronic plotter comprising cathode ray tube.

In Fig. 3 a block diagram is shown of the SEP equipment. (Some control and start circuits are omitted and for the sake of simplicity electro mechanical selectors (G and I) are shown instead of electronic selectors). For memory circuits condensers are shown. It is, however, considered advantageous to use magnetic memory circuits.

The aforementioned signals mentioned under (a) and (b) are received by the receiver A, from which voltages (11) and (16) are fed to the register B for application to the several output lines in accordance with the predetermined identity signals from the craft. The voltage (5) is fed to the frequency detector C, voltage (1) is fed to the comparator E together with voltage (7) which is supplied from the frequency detector C, from which also voltage (8) is fed to the comparator D together with voltage (3) which is supplied directly from the VOR transmitter. From the comparators D and E, respectively, are obtained $2\varphi$, which is proportional to the distance, and $\alpha$ which is proportional to azimuth. These are fed to the translator F from which the position of the aircraft is derived in $x$ and $y$ coordinates. A suitable translator may be of the type disclosed in U.S. Patent No. 2,714,199, issued to P. R. Adams and J. L. Allison on July 26, 1955. In the meantime the register B has positioned the feeding device G in the correct position, for instance digit combination 297, such that the voltages $x$ and $y$ are applied to the correct memory circuits H for the corresponding craft. Supposing that the station has been operated for some time, a blocking pulse will cancel the indications on the screen of memory tube R which may have a storage or writing beam, and a reading beam, simultaneously as a starting pulse starts the scanning device I which scans all the memory circuits H. In Figure 3, the scanning device H is considered as it passes the contacts corresponding to digit combination 297. It is noted that the $x$ and $y$ coordinate voltages are fed to the writing beam deflecting plate set R' in the memory tube R simultaneously as square wave pulses from the square wave generator J are supplied to the $x$ deflecting plate set L' of the flying spot scanner L. The saw tooth wave generators P and Q supply voltages to the deflecting plate sets in both the memory tube R and the flying spot scanner L such that these are scanned in synchronism. Referring to Fig. 4 the pulses from J are considered relative to the saw tooth voltages $x$ and $y$. It is noted that the amplitudes of the square wave pulses are variable. For a certain digit combination for instance 297 three amplitudes of the pulses are defined. In Fig. 5 is shown the sum of the pulses from J (1, 2 and 3) and the $x$ pulse from P where the amplitudes, respectively, correspond to the numbers 2, 9 and 7. When this resulting $x$ pulse is applied to the $x$ deflecting plate set in the flying spot scanner L (consult Fig. 3), the numbers 2, 9 and 7 in the number series O (M) will be scanned in correct succession. The video signal is detected by the photocell N, amplified in K and supplied to the control grid of the memory tube R, and since $x$ and $y$ are derived from P and Q together with the D.C. voltages $x$ and $y$ from the memory circuits H, the identification 297 will be placed in the correct position on the screen as indicated in Fig. 6.

All the other information which has been stored in other memory circuits in H will successively affect the equipment in the same manner, such that the information is again applied to the memory tube R and correctly placed.

It is noted that this part of the equipment is only operated each time an aircraft has been transmitting. The position of this plane is thus changed on the screen in accordance with the position of the plane at the moment of transmission. All positions of the other planes on the screen stay unchanged until the next time transmission from these planes is undertaken.

Since the screen of the memory tube is not well fitted for direct reading, this screen is read by means of a deflecting plate set R" and the video signal is amplified in U and applied to a projector cathode ray tube V, and the common saw tooth wave generators S and T undertake the synchronous scanning. The scanning can be undertaken 25 or 50 times a second as desired and this is a question of the band width of the amplifier U. The projector cathode ray tube V projects the indications of the planes on the map-screen W in correct positions.

Instead of using a cathode ray tube, a projector lamp can be used, projecting identification of the planes on the map-screen. In Fig. 7 an arrangement of this system is shown. All the blocks from A to I are the same as this shown in Fig. 3. I performs, however, a continuous scanning in this system such that the memory circuit H supplies pulses to two amplifiers which are individual for each projector. Fig. 8 shows pulses from two successive planes, the $x$ (J) and $y$ (K) amplifiers, and output voltages as a function of time. These output voltages are supplied to separate projectors and cause these to move in the horizontal and vertical, $x$ and $y$, plane proportionally to the values of the amplitudes, see Fig. 9. In order to obtain the best possible control with the movements of the projectors, this can be supplied with potentiometers which follow the movements in both planes and which are connected to the amplifiers such that a feed back is obtained.

It is apparent that it is necessary to have one projector tube corresponding to each aircraft to be plotted. If for instance 200 planes are to be plotted, the equipment will become very elaborate. It is further not possible in this system to supply different information to the characteristic indications of the airplanes on the map-screen without very complicated equipment.

Referring to Fig. 3, the attention is called to some refinements by the system comprising cathode ray tubes. If multiplied the receivers A (and the equipment from B to G) are provided in order to plot aircrafts operating on different radio channels, it is possible in the same manner as obtaining projections of the characteristic indications of the aircraft on the map-screen, to place a letter in front of the characteristic indication of the airplane in order to indicate the radio channel used. Further the height and the velocity meter in the aircraft can (in a well known manner) apply to the aircraft transmitter signals which modulate the transmitted energy, such that the signals when received in the SEP equipment control pulses in the manner previously mentioned, such that the information is also applied to the map-screen, for instance below the characteristic indication of the aircraft. Fig. 10 shows a section of the map-screen W where on the right side a fighter plane is plotted. B indicates the radio channel, the digit combination 297 is the characteristic indication of the aircraft, 18 indicates the height in 1000 feet and 0.8 indicates the velocity in Mach (1 Mach equal to velocity of sound). This information (height and velocity) can also be introduced by means of a system corresponding to G controlled by a dial, operated in correspondence with information received from the pilot over the radio.

Enemy planes may be detected by means of radar and can be displayed on the SEP equipment in different manners:

The picture on the radar screen (P.P.I.) may be transmitted over a line or a link, applied to a memory tube corresponding to R, in order to convert the signals from radial scanning to vertical or horizontal. All information will then be reproduced on the map-screen such that undesired reflections, noise etc. will not disturb the picture. In order to determine the course of enemy planes these are classified in groups, each group having an individual number and it is therefore considered advantageous to make use of normal reading of the radar screen and to supply this information over a particularly designed telemeter system and let these control pulses corresponding to these previously mentioned in the SEP equipment for automatic plotting. The signals are applied to a flying spot scanner corresponding to L. In Fig. 10, at the left, is shown an example of how the result is indicated on the map-screen W: An enemy group 19 consisting of approximately 20 planes, height 20,000 feet and velocity 0.9 Mach.

In this manner information is supplied to the map-screen in a desired manner and the principle of the basic system can be used again as many times as desired.

Further it is possible to interconnect small cathode ray tubes in parallel with the projector tube V such that smaller sections of the map-screen W can be obtained. This is desirable when the course of aircrafts is to be determined in order to be directed towards enemy planes. It is also possible to install small cathode ray tubes at the position of the flight marshal. These may show the aircrafts calling and indicate the radio channels and the characteristic indications etc., or it is possible to install a cathode ray tube for each channel since simultaneous calling of several channels otherwise may occur.

What is claimed is:

1. A display system for producing a display in two co-ordinates of the positions of each of a plurality of objects in response to signals from each of said objects indicating its identity, its direction and its distance from a given point, comprising means for applying said received identity signals to each of separate lines, including switch means movable for connection to each of said separate lines, means for scanning said switch means over said lines, means connected to said applying means for producing and storing voltages corresponding to right angularly related position coordinates in response to the distance and direction signals from said objects, means for scanning said storage voltages simultaneously with the scanning of said switch means, a cathode ray tube, means for scanning the beam of said cathode ray tube over an indicating surface simultaneously with the scanning of said switch means over said separated lines and the scanning of said corresponding storage means deflection means for said cathode ray tube, means for applying said stored voltages to said deflection means and means responsive to said input signals for controlling the intensity of the beam during each scanning cycle to provide successive indications of the positions of said objects.

2. A system according to claim 1, wherein said cathode ray tube is a storage type tube, and said indicating surface is a storage screen, further comprising a set of reading deflection devices on said storage cathode ray tube, means for applying synchronized scanning voltages to said deflection means and said deflection devices, and display means for said display cathode ray tube whereby stored signals on said storage tube are displayed.

3. A system according to claim 2, further comprising means operative synchronously with the scanning of said beam of said storage tube for producing an indication corresponding with the identity signals from said objects, and means for applying said identity signals to said storage tube to produce an indication of said identity signals at the positions corresponding to the positions of the signaling objects.

4. A system according to claim 3, wherein said indication producing means is a flying spot scanner, a signal emblem screen mounted to be scanned by said scanner, and signal pick-up means responsive to the scanning of said screen.

5. A system according to claim 2, wherein said display tube is a projection tube, and said means-to-display comprises a projection lens system and a projection screen.

References Cited in the file of this patent

UNITED STATES PATENTS

| | | |
|---|---|---|
| 2,252,083 | Luck | Aug. 12, 1941 |
| 2,550,316 | Wilder | Apr. 24, 1951 |
| 2,595,141 | Herbst | Apr. 29, 1952 |
| 2,622,240 | Fleming-Williams | Dec. 16, 1952 |
| 2,774,964 | Baker | Dec. 18, 1956 |